3,080,325
PROCESS FOR PROVIDING IMPROVED MAINTENANCE TO ELECTROLUMINESCENT PHOSPHORS

Manuel Aven, Lyndhurst, and Ralph M. Potter, Cleveland Heights, Ohio, assignors to General Electric Company, a corporation of New York
No Drawing. Filed Apr. 8, 1959, Ser. No. 804,877
4 Claims. (Cl. 252—301.6)

This invention relates to electroluminescent materials or phosphors and more particularly to a treatment for improving the maintenance of electroluminescent phosphors.

Electroluminescent phosphors are used in electroluminescent lamps or cells wherein a thin layer of phosphor which may be dispersed in a suitable dielectric medium is sandwiched between a pair of conducting plates at least one of which is transparent. When an alternating voltage is applied across the plates, the phosphor emits visible light which escapes through the transparent plate.

The known electroluminescent phosphors, principally zinc sulfide and selenide are subject to relatively rapid depreciation in brightness during life. Such depreciation is particularly rapid under conditions of high humidity. That type of depreciation, commonly known as wet depreciation, is many times faster than the dry depreciation which occurs in a comparatively water-free environment. Fortunately it can be reduced or substantially prevented by suitable encapsulation or sealing of the electroluminescent lamp. Dry depreciation on the other hand cannot be so reduced and persists in spite of the best and most complete encapsulation techniques available. It is to reduction of the dry depreciation of electroluminescent phosphors that the present invention is particularly directed.

The object of the present invention is to provide a phosphor treatment for improving the maintenance of electroluminescent phosphors.

A more specific object of the invention is to provide a treatment for improving the dry maintenance of electroluminescent phosphors.

According to the invention, we have discovered that a remarkable and totally unexpected improvement in dry maintenance may be effected by subjecting the phosphor after the usual wash to remove surface contaminants to a relatively low temperature heat treatment or annealing in the range of 300 to 700° C. The present heat treatment follows the weak acid and cyanide wash which have generally been the last step in electroluminescent phosphor preparation. The treatment is not to be confused with annealing treatments preceding the wash. The improvements in maintenance achieved thereby indicate an increase in the extrapolated half-life to as much as 360,000 hours, or roughly 40 years. It will be appreciated that these results are based on computations and extrapolation and not upon tests of corresponding time duration. The treatment does not impair the brightness of coarse phosphors which have been tested in polystyrene and oil cells. Fine phosphors have shown some loss of brightness, not exceeding about 40%, as a result of the heat treatment. Both types of phosphors have shown the remarkable improvement in maintenance of brightness.

The following are examples of phosphors treated in accordance with the invention to improve the maintenance characteristic.

EXAMPLE 1.—FINE GREEN ZINC SULFIDE PHOSPHOR

The starting material may be a well-known fine particle size green electroluminescent phosphor of zinc sulfide activated with copper and coactivated with chlorine and prepared according to conventional techniques. For instance a mixture of 75% by weight ZnS and 25% ZnO with approximately 0.5 mol percent copper in the form of $CuSO_4$ and chlorine in the form of $NH_4Cl$ or $ZnCl_2$ to give between 1 and 3 mol percent chlorine is fired at 900° C. in covered crucibles in air. The fired product is then washed to remove surface contaminants: in acetic acid to remove free zinc oxide and then in sodium cyanide solution to remove excess or superficial copper compounds. Such washing likewise is a known technique disclosed for instance in Patent 2,731,423, Prener.

In accordance with the present invention, the fired and washed material is now heated for about 15 minutes at 500° C. in a stagnant nitrogen atmosphere. The phosphor may be placed in a bottle-shaped firing vessel and pure nitrogen gas passed through the vessel by means of a capillary tube extending to the bottom of the vessel. During this period, the vessel is rotated about every half-minute to assure a good exchange of loosely adsorbed and trapped air on the phosphor particles for nitrogen. The nitrogen inlet tube is withdrawn after about three minutes and the opening in the neck of the vessel is quickly stoppered with a wad of glass wool. This serves to prevent any rapid diffusion of air into the firing vessel during the heating while still allowing expanding gases to escape. The firing vessel is then placed in a furnace preheated to 500° C. A sufficient heating time for a 10 to 15 gram phosphor lot is 15 minutes. While being heated, the vessel is rotated about once every three minutes. The vessel is then withdrawn while still hot and allowed to cool to room temperature without forced cooling. The treated phosphors can be stored for several months in stoppered (but not necessarily desiccated) containers without impairment of their acquired resistance to depreciation.

EXAMPLE 2.—COARSE GREEN ZINC SULFIDE PHOSPHOR

The starting material may be a coarse green electroluminescent phosphor of zinc sulfide activated with copper and coactivated with chlorine and prepared as described and claimed in copending application Serial No. 729,227, filed April 18, 1958, by Manuel Aven, now U.S. Patent No. 3,000,834, entitled Electroluminescent Green Zinc Sulfide Phosphor, and assigned to the same assignee as the present invention. This phosphor is of comparatively large particle size in order to have improved resistance to wet depreciation.

To prepare the phosphor, precipitated ZnS and ZnO in a weight ratio of 3:1 is prefired for one hour at 1200° C. in a silica tube closed at one end and having the other end partially sealed by a plug allowing escape of volatile components: The prefired material is cooled and copper sulphate solution added to give 0.5 mol percent copper and zinc chloride to give 2 mol percent chlorine to the prefired material. After drying the mixture is fired at 900° C. for 18 hours in a silica tube, partially closed as previously described to prevent ingress of air. The fired material is then washed in a weak acid solution such as dilute HCl or acetic acid to remove free ZnO followed by a wash in dilute KCN or NaCN or other suitable solution to remove superficial copper compounds. The dilute acid wash may be repeated again and the material rinsed in distilled water and then dried.

As stated in said copending Aven application, the resulting material has a much improved resistance to wet depreciation, apparently due to its comparatively large particle size averaging approximately 30 microns in diameter.

In accordance with the present invention, the phosphor material is further treated by heating for about 15 minutes at 500° C. in a stagnant nitrogen atmosphere to improve the resistance to dry depreciation. The procedure used may be the same as has been previously described under Example 1. Alternatively the phosphor may be annealed at 300° C. for 30 minutes, or at 700° C. for 10 minutes.

EXAMPLE 3.—GREEN ZINC-ALUMINUM SULFIDE PHOSPHOR

A green copper-activated zinc-aluminum sulfide phosphor was prepared by the procedure described in U.S. Patent 2,743,240, Froelich, which includes as final steps washing in a lukewarm 5% solution of NaCN, rinsing in distilled water and then drying. The phosphor was then annealed at 500° C. for about 15 minutes in a stagnant nitrogen atmosphere to improve the resistance to dry depreciation.

EXAMPLE 4.—YELLOW ZINC SULFO-SELENIDE PHOSPHOR

A copper-activated zinc sulfide zinc selenide phosphor composed of 60 mol percent ZnS and 40 mol percent ZnSe was prepared by firing for 1 hour at 1100° C., washed in NaCN (without acid wash), and then rinsed in distilled water and dried. It was then annealed for about 15 minutes at 500° C. in a stagnant nitrogen atmosphere to improve the resistance to dry depreciation.

The improved maintenance of the treated phosphors is evident from the life test data given in Table I below. For these tests, the phosphors were incorporated in plastic cells by dispersing the phosphor in a layer of polystyrene over an insulating layer of barium titanate in cyanoethyl cellulose plasticized with cyanoethyl phthalate and coated on an aluminum foil. The coated foil was overlaid with a sheet of conducting glass paper and encapsulated in a thin polyethylene envelope evacuated and heat sealed around its edges as per copending application Serial No. 701,906 of Elmer G. Fridrich and Paul A. Dell, filed December 10, 1957, entitled "Electroluminescent Lamp and Manufacture Thereof," and assigned to the same assignee as the present invention, now Patent 2,945,976. The cells were tested by operating them in a controlled humidity box held at 1% relative humidity, the cells being operated by alternating current at 120 volt, 60 cycles. The half-life given is the time required for the cell brightness to depreciate to half the original brightness.

Table I

| Phosphor: | Half-life (hours) |
|---|---|
| Fine green ZnS: | |
| Untreated | 2600–3500 |
| Treated | 5300–6000 |
| Coarse green ZnS: | |
| Untreated | 17,000 |
| Treated | 360,000 |

Plastic cells of the same construction but operated at 85% relative humidity showed for the coarse green untreated phosphor a half-life of 125 hours and for the coarse green treated phosphor a half-life of 165 hours.

The results of accelerated depreciation tests on the phosphors of the foregoing examples as well as others are given in Table II below. For these tests, dispersions of the phosphors in dry chlorinated biphenyl (Aroclor, described in publication O–P–115 of Monsanto Chemical Company), were placed between a metal electrode and a conducting glass plate at a spacing of .005″ and operated at 300 volts, 5000 cycles per second.

Table II

| Phosphor: | Half-life (hours) |
|---|---|
| Zinc sulfide fine green: | |
| Untreated | 6 |
| Treated | 25 |
| Zinc sulfide coarse green: | |
| Untreated | 21 |
| Heat treated | 25 |
| Zinc sulfo-selenide yellow: | |
| Untreated | 16 |
| Treated | 28 |
| Zinc-aluminum sulfide green: | |
| Untreated | 6 |
| Treated | 42 |

In other tests of the fine green phosphor in oil cells as previously described but using wet Aroclor and energized at 300 volts, 60 cycles, the untreated phosphor depreciated to 42% to 45% of its initial brightness after 30 minutes of operation whereas the treated phosphor depreciated only to 54% to 57% of its initial brightness after the same period of operation.

The foregoing data show that although the greatest improvement in maintenance produced by the heat treatment of the instant invention is obtained with cells using dry dielectrics and operated in a dry environment, the heat treatment is also beneficial under wet environment conditions.

Many of the conditions stated in the foregoing examples are not critical. As regards the mode of preparation of the phosphors, the initial steps and particularly the firing and re-firing procedure can be varied at will within the current knowledge of the art provided the cyanide wash is followed eventually by the heat treatment of the instant invention. The cyanide wash may be preceded or followed by a weak acid wash, or may be used alone. Regarding the heat treatment proper, whereas it is preferred to perform it in nitrogen, almost equally good results will be obtained if it is performed in air. Likewise inert gases such as argon may be used. Hydrogen and hydrogen sulphide however were found to be deleterious to brightness. Firing temperatures ranging from 300° C. to 700° C. with firing time of 15 minutes, as well as firing times between 10 and 45 minutes with firing temperature at 500° C. could be used. Using the maintenance of brightness of a fine green phosphor in wet Aroclor as the optimizing parameter, it was found that a shallow optimum lying at 15 minutes firing time at 500° C. existed.

Although the above-described testing results show the benefit of the instant heat treatment irrespective of the knowledge of the particular mechanism producing the improved maintenance characteristics, the working hypothesis which we have conceived regarding the phenomena involved may facilitate understanding of the invention. It will also help to understand the difference between the present heat treatment and various other annealing treatments proposed by the prior art in respect of electroluminescent phosphors.

It has been proven extremely difficult to establish definitely whether there exists a so-called "dry" or "natural" depreciation of electroluminescent phosphors as has been proposed by some workers in the field (conf. S. Roberts, J. Appl. Phys. 28, 262 (1957); W. A. Thornton, J. Appl. Phys. 28, 313 (1957)), and, if such a "natural" depreciation exists, what the associated limiting depreciation rate is. Probably the reason for this difficulty is the ubiquitous and all pervading nature of water vapor. Even the most carefully prepared electroluminescent cells or lamps operated in a completely anhydrous enviroment often show signs of water-promoted depreciation. One of the reasons for this may be that chemisorbed water or even a few layers of physically adsorbed water on the surface of a fine powder like a zinc sulfide powder is very hard to remove at temperatures below 200° C,. This temperature is the maximum to which the cell components including the phosphors are subjected prior to or during encapsulation in plastic materials, as for instance in electroluminescent lamps of the kind described in the aforementioned copending Fridrich and Dell application. This is particularly true in view of the washing of electroluminescent phosphors with a weak acid such as dilute hydrochloric acid or acetic acid and with a cyanide solution such as sodium or potassium cyanide. In spite of thorough rinsing with water, a certain amount of adsorbed salts like potassium or sodium cyanide or acetate, or reaction products from the wash such as zinc acetate, zinc cyanide, etc. probably stays on the phosphor particles. Many of these impurities are hygroscopic and can serve as places on the phosphor surface where water can be chemisorbed. It is also possible that besides serving as convenient sites for physical adsorption or chemisorption of water, the electrolytes on the surface of phosphor particles may also be deleterious by themselves, particularly in high dielectric constant media like cyanoethyl cellulose plasticized with cyanoethyl phthalate. Evidence for the presence of such salts has been furnished by mass spectrometer runs on several phosphor samples: the species liberated upon heating at 500° C. were large amounts of $CO_2$, medium amounts of $SO_2$, SO, $CH_3$ and COOH, and also some HCN and CN. The $CO_2$ probably originates from atmospheric $CO_2$ which had reacted with alkalies on the phosphor surface, $CH_3$ and COOH from breakdown of acetates, HCN and CN from cyanides. It seems reasonable to believe that the removal of these electrolytes is at least partially responsible for the increased resistance to depreciation achieved through the present invention.

The possibility also exists that the instant heat treatment is causing a favorable rearrangement of the luminescent centers in the phosphor, or a chemical or physical change other than the removal of adsorbed impurities on the surface of the phosphor particles, for example a slight surface oxidation. In any case it appears that the heat treatment brings about a passivation of the phosphor surface with respect to depreciation.

The specific examples of embodiments of the invention given herein are intended as illustrative and not as limitative of the invention whose scope is to be determined by the appended claims.

What we claim as new and desire to secure by Letters Patent of the United States is:

1. The method of treating an electroluminescent zinc sulfide phosphor to provide improved maintenance and particularly improved resistance to dry depreciation which comprises washing the phosphor after the firing procedure in a cyanide solution to remove excess copper compounds and thereafter heat treating the washed phosphor at a temperature in the range from 300 to 700° C. in an atmosphere selected from the group consisting of neutral and oxidizing atmospheres.

2. The method of treating an electroluminescent zinc sulfide phosphor to provide improved maintenance characteristics and particularly improved resistance to dry depreciation which comprises the steps of washing the fired phosphor in a weak acid from the group consisting of acetic acid and dilute hydrochloric acid and in a cyanide solution from the group consisting of sodium cyanide and potassium cyanide, and thereafter heat treating the washed phosphor for at least 10 minutes at a temperature in the range of 300 to 700° C. in an atmosphere selected from the group consisting of neutral and oxidizing atmospheres.

3. The method of treating an electroluminescent zinc sulfide phosphor to provide improved maintenance characteristics and particularly improved resistance to dry depreciation which comprises the steps of washing the fired phosphor in a weak acid from the group consisting of acetic acid and dilute hydrochloric acid to remove free zinc oxide and in a cyanide solution from the group consisting of sodium cyanide and potassium cyanide to remove excess copper compounds, and thereafter heat treating the washed phosphor for at least 10 minutes at a temperature in the range of 300 to 700° C. in an atmosphere selected from the group consisting of neutral and oxidizing atmospheres.

4. The method of treating a zinc sulfide electroluminescent phosphor to provide improved maintenance characteristics and particularly improved resistance to dry depreciation which comprises the steps of washing the fired phosphor in a weak acid from the group consisting of acetic acid and dilute hydrochloric acid and in a cyanide solution from the group consisting of sodium cyanide and potassium cyanide, and thereafter heat treating the washed phosphor for at least 15 minutes at a temperature of approximately 500° C. in an atmosphere of nitrogen.

References Cited in the file of this patent

UNITED STATES PATENTS

| 2,731,423 | Prener | Jan. 17, 1956 |
| 2,821,509 | Hunt | Jan. 28, 1958 |
| 2,950,257 | Froelich | Aug. 23, 1960 |

FOREIGN PATENTS

| 526,181 | Belgium | Aug. 2, 1954 |
| 718,804 | Great Britain | Nov. 17, 1954 |

OTHER REFERENCES

Kroger: "Some Aspects of Luminescence of Solids," Elsevier Pub. Co., N.Y. (1948), pages 65–73.